Oct. 30, 1956 C. THUMIM 2,769,057

TIME DELAY CIRCUIT BREAKER

Filed Nov. 1, 1951 11 Sheets-Sheet 1

INVENTOR.
CARL THUMIM

BY Ostrolenk & Faber

ATTORNEYS

Oct. 30, 1956 C. THUMIM 2,769,057

TIME DELAY CIRCUIT BREAKER

Filed Nov. 1, 1951 11 Sheets-Sheet 2

INVENTOR.
CARL THUMIM
BY Ostrolenk & Faber
ATTORNEYS

Oct. 30, 1956 C. THUMIM 2,769,057

TIME DELAY CIRCUIT BREAKER

Filed Nov. 1, 1951 11 Sheets-Sheet 3

INVENTOR.
CARL THUMIM

BY Ostrolenk + Faber

ATTORNEYS

INVENTOR.
CARL THUMIM
BY Ostrolenk + Faber
ATTORNEYS.

TIME DELAY CIRCUIT BREAKER

Filed Nov. 1, 1951

INVENTOR.
CARL THUMIM

BY Ostrolenk & Faber

ATTORNEYS

INVENTOR.
CARL THUMIM

BY Ostrolenk + Faber

ATTORNEYS

INVENTOR.
CARL THUMIM
BY Ostrolenk & Faber
ATTORNEYS

TIME DELAY CIRCUIT BREAKER

Filed Nov. 1, 1951 11 Sheets-Sheet 8

INVENTOR.
CARL THUMIM
BY Ostrolenk & Faber
ATTORNEYS

Oct. 30, 1956 C. THUMIM 2,769,057

TIME DELAY CIRCUIT BREAKER

Filed Nov. 1, 1951 11 Sheets-Sheet 9

INVENTOR.
CARL THUMIM

BY Ostrolenk & Faber

ATTORNEYS

INVENTOR.
CARL THUMIM

BY Ostrolenk & Faber

ATTORNEYS

Oct. 30, 1956 C. THUMIM 2,769,057

TIME DELAY CIRCUIT BREAKER

Filed Nov. 1, 1951 11 Sheets-Sheet 11

INVENTOR.
CARL THUMIM
BY Ostrolenk + Faber
ATTORNEYS

United States Patent Office 2,769,057

Patented Oct. 30, 1956

2,769,057

TIME DELAY CIRCUIT BREAKER

Carl Thumim, Yeadon, Pa., assignor to I-T-E Circuit Breaker Company, Philadelphia, Pa., a corporation of Pennsylvania Application November 1, 1951, Serial No. 254,348

2 Claims. (Cl. 200—108)

The present invention is a continuation in part of application Patent No. 2,704,311 and relates to switchgear and more particularly to circuit breakers having overcurrent trip units constructed so that a plurality of circuit breakers may be connected in series in a selective system, i. e., each of the circuit breakers is capable of interrupting any fault in its locality so that service is interrupted in only that part of the system where the fault occurs, leaving the remainder of the system in service.

An essential of circuit breakers for such selective system is the provision of a short time delay in the circuit breaker trip mechanisms responsive to short circuit currents, that is, currents approximately four times normal and over, the short time delay being of the order of cycles in a 60 cycle system and being adjustable and individual for each circuit breaker, varying from each other by times measurable in cycles.

Some of the circuit breakers are also provided with long time delays of the order of seconds for operations in response to overcurrents. It may also be desirable to provide instantaneous trip operation with no intentional time delay in response to especially severe faults.

The problems raised in the construction and operation of circuit breakers having multiple time delay characteristics for different current values have been pointed out in Patent No. 2,439,165, application Serial No. 488,841, filed May 28, 1943, now U. S. Patent 2,491,657, granted Demember 20, 1949, and application Ser. No. 148,696, filed March 9, 1950, which are assigned to the assignee of the present invention.

Essentially the long time delay in the operation of the trip devices for overcurrent conditions of lower values (up to, for instance, twelve times normal) is adjusted to time of operation such that a circuit breaker trip unit will, on relatively low overcurrent conditions, be sufficiently delayed to permit the circuit breaker nearest to the load in the selective trip system to remove the overloaded circuit to keep the number of circuits which may be opened by such an overload to a minimum.

The long time delay feature, of course, has the further function of providing temporary low overcurrent conditions with an opportunity to clear themselves within a reasonable time before any circuit breaker need open.

Thus the long time delay functions to permit only that circuit breaker to open which is necessary to clear an overload fault and the short time delay functions to permit only that circuit breaker which is necessary to clear a short circuit fault.

The application of the principle of selective tripping, i. e., the tripping of one of a plurality of circuit breakers connected in series between a generator or source of power and the load in such manner that the particular circuit breaker nearest the fault opens before the other circuit breakers closer to the source of power can trip and thereby leaving them in operation becomes complex when an attempt is made to apply the principle to short circuit currents. Here the permissible time delay is the order of cycles—from two to about thirty cycles and in some cases from two to fifteen cycles.

It will be apparent that, with such short time delays, securing a sufficient and constant difference in time of operation between the independent circuit breaker trip devices so that the one nearest the fault will trip, leaving the others in service, is difficult.

In addition to the long and short time delays mentioned above, in order further to protect not only the circuits but the circuit breakers themselves, each circuit breaker in the selective system may be provided with a quick trip feature free of any time delay adjusted to permit an instantaneous trip of the circuit breaker at current values above the current value for which the short time delay is set.

Thus, the long time delay of the trip operation, the short time delay of the trip operation, and the instantaneous trip each have their respective appropriate function depending on current conditions.

While the present invention is peculiarly adapted to the requirements of a selective system, the combination of long time delay, short time delay and instantaneous trip may in appropriate circumstances adapt a single circuit breaker for use under specified load conditions where these tripping characteristics are required for a particular piece of apparatus; that is, a particular machine may have characteristics during which a low overcurrent condition prevails for up to a few seconds and which usually clears itself and it may undergo other conditions where a high current condition prevails for only a cycle or two, and it may also require short circuit protection.

These various conditions would, of course, be met by the long time delay, the short time delay and the instantaneous trip.

The primary object of the present invention is the provision of a novel combination tripping device for a circuit breaker having a long time delay, a short time delay, and an instantaneous trip.

Another object of the present invention is the provision of novel means for adjusting each of the long time delay, the short time delay, and the instantaneous trip.

Another object of the present invention is the construction of a trip unit for a circuit breaker having two armatures, one armature being provided with the long time delay and the instantaneous trip and the other armature being provided with the short time delay.

Another object of the present invention is the provision of a novel short time delay unit for a circuit breaker tripping devce.

Another object of the present invention is the provision of a short time delay unit including an escapement mechanism wherein the resonant frequency of the verge of the escapement mechanism is damped out.

It has been found that in the utilization of an escapement mechanism as a time delay, especially for the short time delay feature, that the curve of operation with ordinary escapement mechanisms was not a smooth one, time delay was not a proportional function of the fault current.

In accordance with the present invention, it has been determined that the observable error lay in the natural resonant frequency of the verge and the armature and that means must be provided to overcome or nullify this natural resonant frequency in order to obtain a smooth operation curve.

It is thus also an object of the present invention to secure means on the verge which will damp out its resonant frequency, such means either comprising loose weights carried by the verge or other means which will damp the natural frequency of vibration of the verge so that the verge will move only in response to the motion of the escapement mechanism and will in turn control the escapement mechanism smoothly at all speeds of operation.

Likewise, means are provided to damp out the resonant frequency of the short time delay armature so that it will move only in response to the magnetic force at the rate permitted by and in step with the escapement mechanism.

The long time delay of the trip operation in the present invention utilizes an oil dash pot. The oil dash pots of the suction type are limited to a force which does not exceed one atmospheric pressure.

The present invention overcomes this difficulty making the long time delay device suitable for large circuit breakers by providing a push type circuit breaker.

It is then an important object of the present invention to provide a novel overcurrent device for large circuit breakers.

Another object of the present invention is the provision of a novel pusher type oil dash pot as a long time delay for circuit breakers.

Another object of the present invention is the provision of a novel dashpot construction for the long time delay mechanism, the dash pot being so arranged that a simple adjustment of the dashpot housing will provide adjustment of the long time delay.

Another object of the present invention is the provision of a novel means of calibrating time delay so that a change of calibration of the long time delay armature does not affect the calibration of the short time delay armature and vice versa.

Another object of the present invention is the arrangement of a time delay mechanism so that all time delay is accomplished during approximately the first half or less of the armature stroke on both the short and long time delay.

The armature, therefore, strikes the trip bar without any restraint and delivers with a hammer blow a maximum trip force.

Another object of the present invention is the construction of the armature and time delay mechanism, as well as of the calibration springs, so that the pull curve of the armature as it moves to trip closely follows above the pull curve of the calibration spring so that the device will reset if the current drops to normal load values at any position of the armature.

Another object of the present invention is the provision of short and long time delay elements as single self-contained independently removable units.

Another object of the present invention is the arrangement of the time delay so that calibration of the overcurrent trip current value will not affect either time delay setting and vice versa.

The foregoing and many other objects of the invention will become apparent in the following description and drawings in which Figure 1 shows a series of curves for tripping time of the circuit breaker relative to the system current values.

Figures 1, 1B:
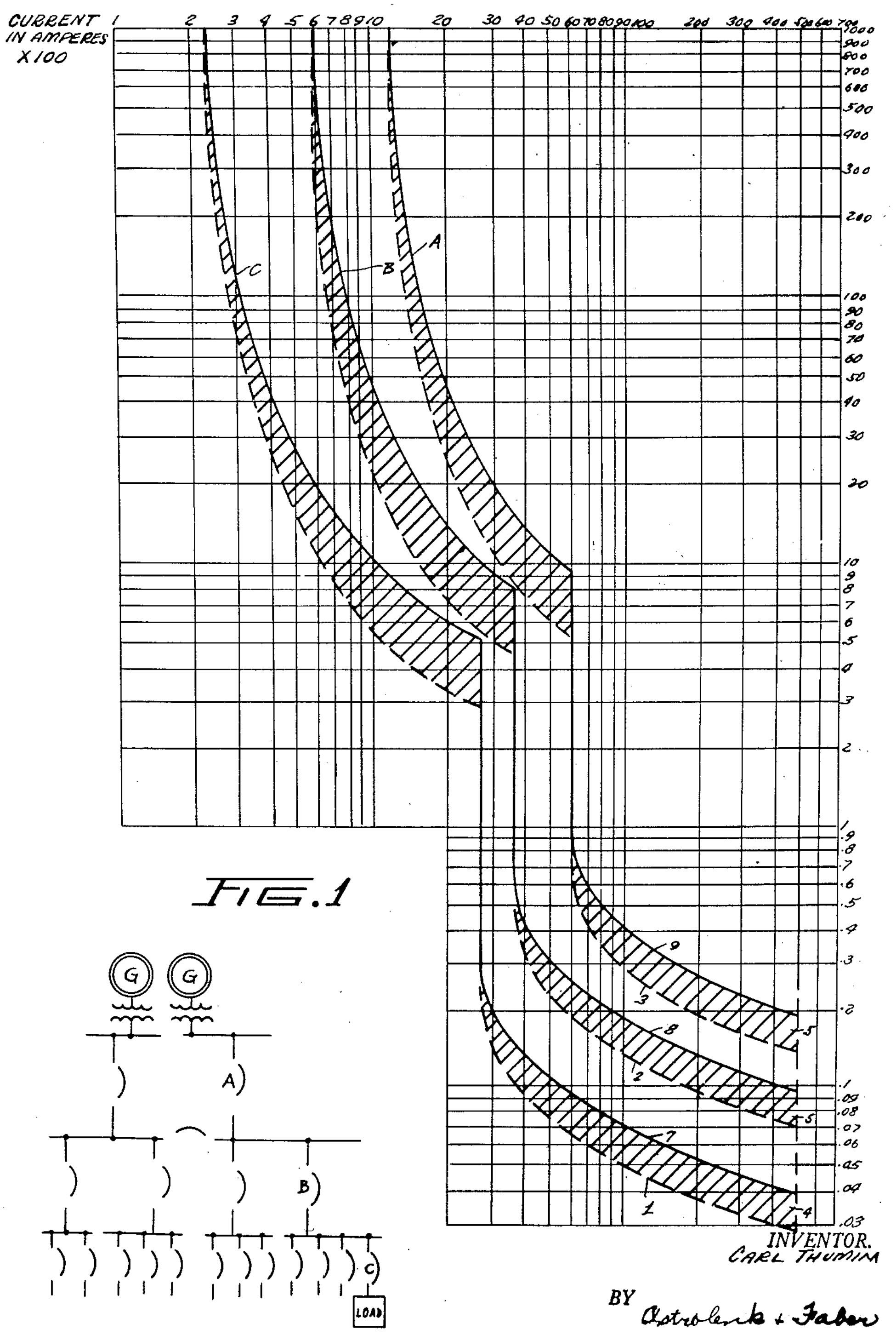
Figure 1B is a circuit diagram of a selective tripping system.

Referring to Figure 1B, the source of power, which may be a generator, transformer battery, etc. is connected to the main bus through circuit breaker A. The main bus is connected to several feeder busses through distribution circuit breakers B. Power is fed from this feeder bus to the various loads such as appliances, motors, etc., through feeder breaker C. Each breaker has sufficient interrupting capacity to handle all current (whether from source or from load as when a motor begins to act as a generator in case of a short circuit on the line) that can reach it. In case of a fault or an overload, the overcurrent device trips the breaker and isolates the section on its load side before any other circuit breaker on its source side can open.

Figure 1 shows the time current settings for the three circuit breakers in juxtaposition so that behavior of each breaker under stress condition may be indicated.

Before entering into a detailed description of the novel circuit breaker of this invention, a brief description of the system and the requirements of the circuit breaker will be given.

In the curves, Figure 1, the lower line 1, 2 and 3 of each of the shaded sections 4, 5 and 6 indicate the maximum time allowable for continuation of any particular fault current and still achieve a restoration of the armature of the trip magnet to normal upon removal of the fault. If the fault continues longer than this time, the armature will not restore but will go on through to trip the latch of its associated circuit breaker.

Thus, for example, assuming a fault of 20,000 amperes; the armatures of the trip magnets for all three circuit breakers A, B and C of this system will start to move simultaneously. If the fault persists for approximately .092 second, which is the time at which 20,000 amperes intersects the curve 2 of circuit breaker B at point 2′, the armature of circuit breaker B can no longer be restored to normal and will go through and trip the circuit breaker.

If, however, this particular fault is cleared at any time less than .092 second, then the armature of circuit breaker B which has moved through a predetermined angle in the interim will, however, restore itself to normal. As will be explained hereinafter, this will be true even if the current in the line drops from the fault current to a full load value for circuit breaker B.

The curves 7, 8 and 9 represent the maximum time for any particular fault current value at which the respective circuit breakers will extinguish the arc. Thus, again for example, if the fault current were 20,000 amperes, circuit breaker G will trip and attempt to extinguish the arc in approximately .052 second, or less.

It will at once become apparent that curve 7 for circuit breaker C can have a time characteristic curve which is just immediately below the curve 2 of circuit breaker B.

This is true because the curve 7 represents the maximum time for the interruption of any particular fault for circuit breaker C. This maximum time must always be less than the maximum allowable time for any particular fault at which the armature of the next circuit breaker B will no longer be restored and selective tripping up to circuit breaker B will be lost.

Inasmuch as the curve 7 represents the maximum allowed time for actual interruption of a fault current and the curve 2 represents the maximum time for which value the armature of the next largest circuit breaker will no longer be restored to normal, these two curves in actual practice may be spaced from each other in minimum measurable time. The actual spacing between shaded portions 4 and 5 is merely shown for convenience and could be substantially reduced.

Summarizing the above, these curves illustrate the following: the pick-up, that is, the time at which the short time armature which is to respond to fault currents, occurs for circuit breaker C at a current value of 2600 amperes; for circuit breaker B at 3500 amperes; and for circuit breaker A at 6000 amperes. At these values the respective armatures of the magnets begin to move toward tripping position. If the fault current is in excess of 6000 amperes, the armatures of all three circuit breakers move simutlaneously. If the fault current is cleared before the time as represented by curve 3 for any particular fault current, but longer than the time as represented by curve 2, then the armature of the trip magnet of circuit breaker A only will restore to normal. If the fault is cleared before the time as represented by curve 2, then the armatures of the circuit breakers A and B will restore; and finally, if for any reason the fault clears before the time of curve 1, then the armatures of trip magnets of circuit breakers A, B and C will restore.

Should the fault, however, continue for at least the time as indicated by curve 1, the armature of the trip magnet of circuit breaker C will go through to tripping action irrespective of what happens to the fault current thereafter. Correspondingly, if the fault persists longer than the time of curve 2, the trip devices of both A and B will be operated.

Figure 1A:
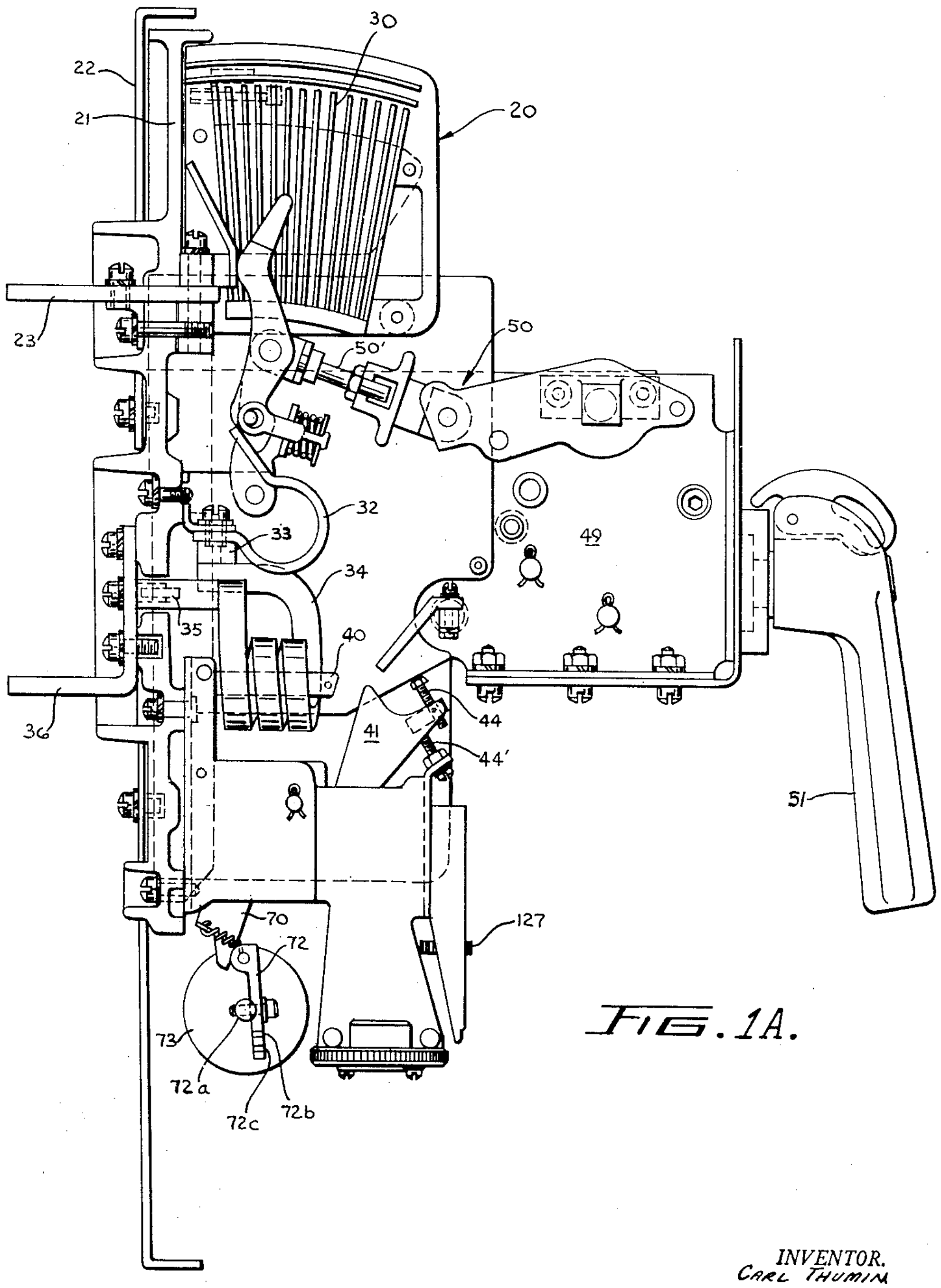
Figure 1A is a view of a representative circuit breaker to which the time delay mechanism of the present invention may be applied.
Figure 1C:
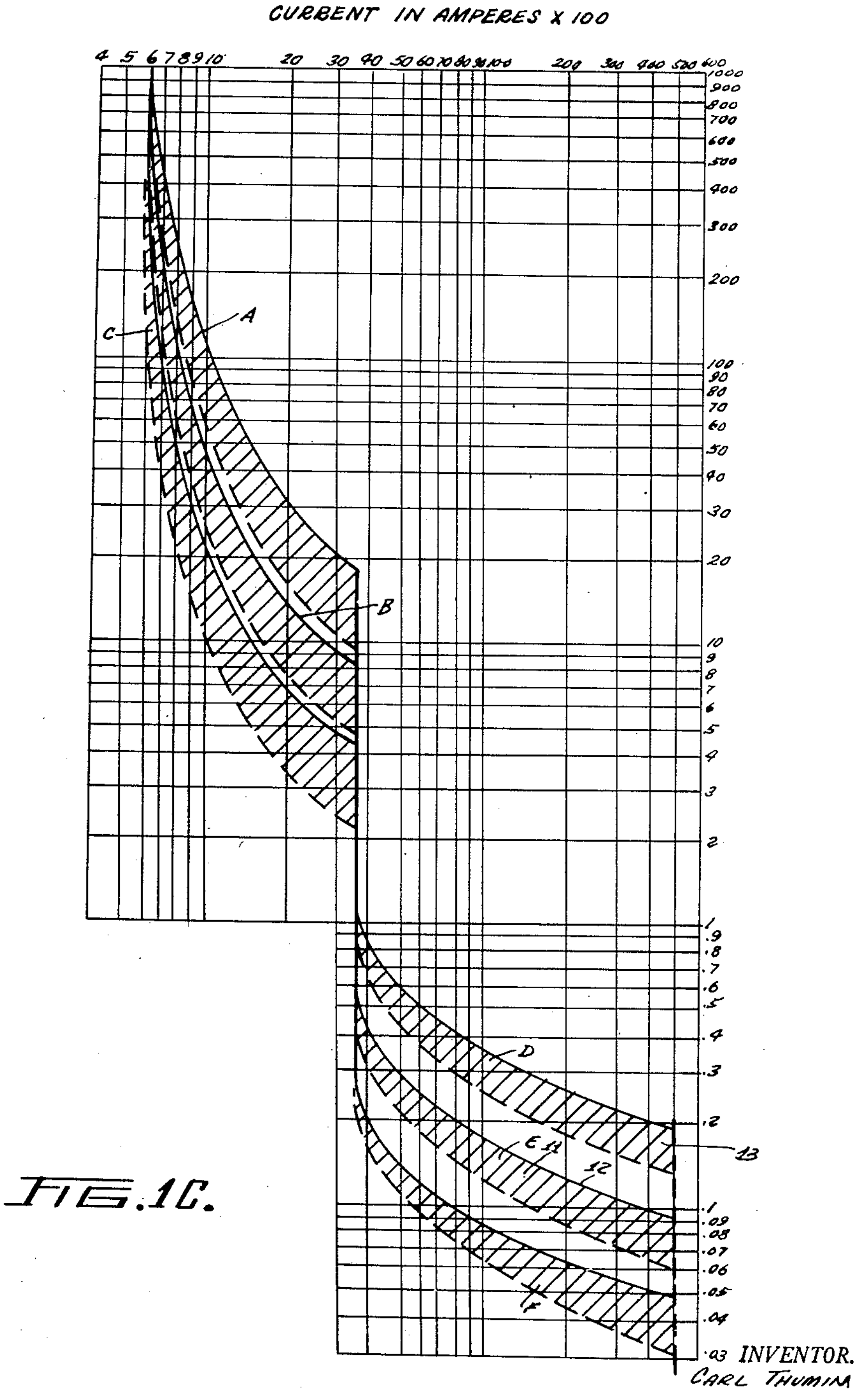
Figure 1C shows a series of curves indicating tripping time adjustments possible in accordance with my invention.

The curves of Figure 1C show adjustments that may be made on the armature of any one circuit breaker. Thus, for example, a circuit breaker may be set so that if a fault current of 40,000 amperes flows for a period of .035 second, the armature of the circuit breaker C will go through and complete the tripping operation. For any time of current flow less than .035 second, however, the armature of circuit breaker C would be restored to normal. The mechanism of the circuit breaker C is also set so that for all of the operations, including the movement of the armature in response to the fault, the operation of the trip latch by the armature, the opening of the contacts of the circuit breaker and the extinguishing of the arc all occur and are completed including the extinguishing of the arc in .052 second.

Correspondingly, the time delay mechanism of the circuit breaker C may be set so that it will have the characteristics as shown by the shaded portions 11. In the case of such an adjustment, if the fault current should persist for .07 second, the armature of the trip magnet will no longer restore and all of the operations described above, including the extinguishing of the arc, will occur along line 12 at .12 second, and similarly the adjustment may be made to occur in the shaded section 13 as described above.

By further adjustment, moving the curves individually to the right so as to change the pick-up time from the fixed value shown at 3500 amperes, each of the breakers may be set to have individual time such as shown in the curves of Figure 1 to provide selective tripping.

A simple adjustment, herein described, which may readily be made in the field will permit a rapid adjustment of the circuit breaker so that the short time delay curve will lie in any of the three bands. The time delay itself may readily be adjusted either at the factory or in the field for variation within the bands.

In Figure 1A I have shown a typical circuit breaker to which the novel trip unit of the present invention may be attached and in connection with which it may be used, although it will be apparent that any other well-known circuit breaker design may be used in connection with the novel time delay mechanism of the present invention.

The circuit breaker 20 of Figure 1A is mounted on the insulating molded element 21 which in turn is supported against the steel compartment panel 22. Back upper connection stud 23 passes through insulating molded element 21 and carries the circuit breaker main stationary contact 24.

With circuit breaker contacts in closed position, current passes from the upper back connection stud 23 to the main stationary contact 24 to the movable contact 25 on the moving contact arm 26. When the circuit breaker contacts are opened to interrupt the current flow, an arc is drawn between the arcing horns 27 and 28 and the arc is extinguished in the arc chute 30.

With circuit breaker contacts in the closed position, current passes from the moving contact 25 through the contact arm 26 through the pigtail 32 to terminal 33 of the series trip coil 34. Current flows through the trip coil 34, thence to terminal 35 which is connected to the back connection stud 36 and thence back to the external electric circuit.

The series trip coil 34 energizes the magnet 40 of the trip device which cooperates with the armatures 41 and 42 hereinafter described (and shown more clearly in Figure 2) to trip the circuit breaker on the occurrence of an overcurrent or a fault condition. Back stops 44′ and 45′ are provided for limiting the back position of the armatures.

When either armature 41 or 42 moves to sealed position of the magnet 40 on energization of the coil 34, the corresponding adjustable striking screws 44 or 45 engage on the tripper bar lever 47 to rotate the tripper bar shaft 48 (Figures 14–17) in the circuit breaker operating mechanism 49 to trip the circuit breaker.

The operating mechanism 49 is connected by linkage 50 to the contact arm 50′ and may be operated remotely by electrical or pneumatic means or by the manual operating handle 51.

Figures 2, 3, 4:
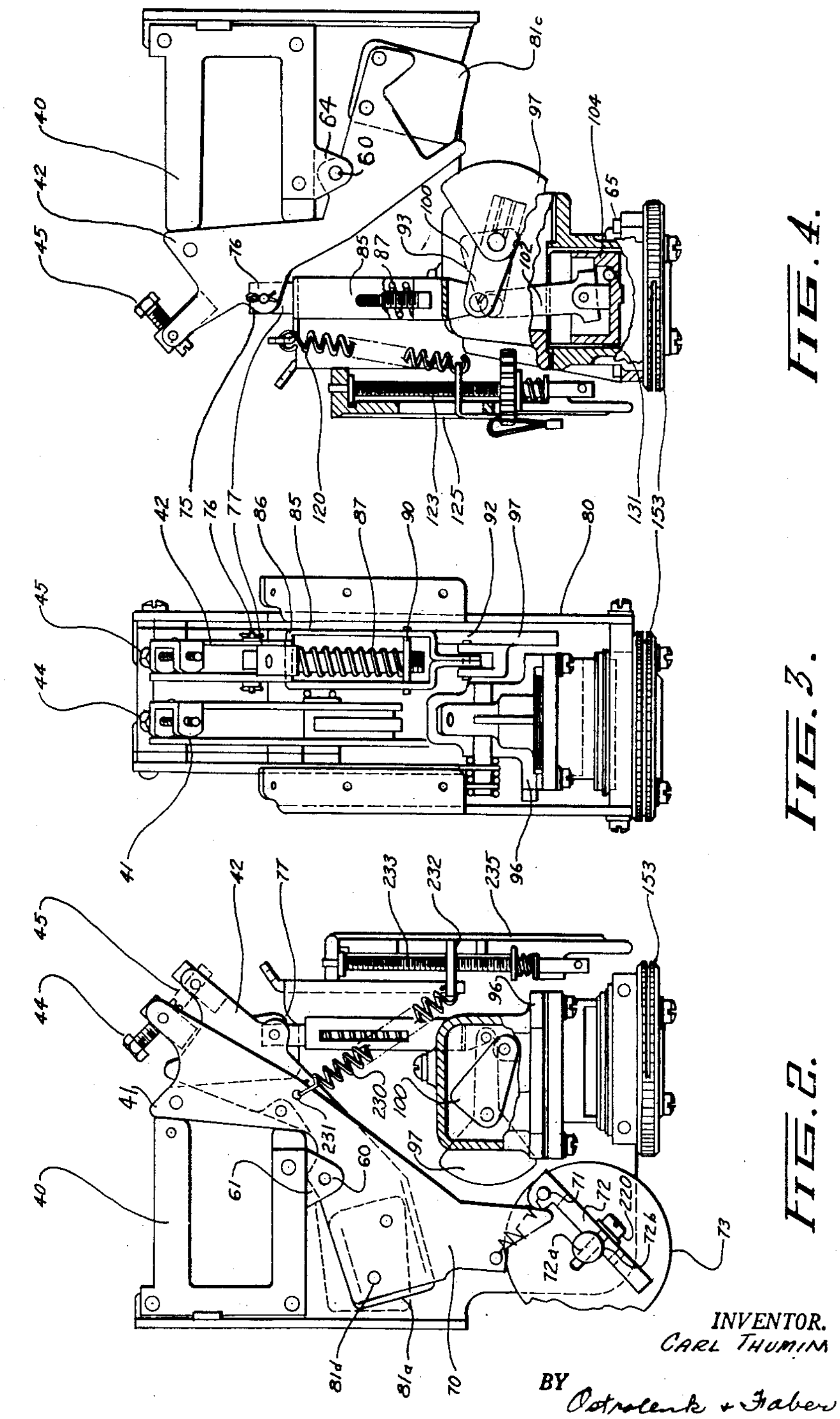
Figure 2 is a side view of the composite time delay device showing both the long and short time delays.
Figure 3 is a front view of the time delay mechanism.
Figure 4 is a side view partially broken away of the time delay mechanism taken from the opposite side from the view of Figure 2 and showing the long time delay element partially broken away.

In Figure 2 I have shown a side view corresponding generally to the view of Figure 1A but with some of the covering elements removed and illustrating the time delay mechanism.

The magnet 40 energized by the series trip coil 34 is arranged so that it may attract either armature 41 or armature 42 or both as current conditions require.

Armatures 41 and 42 are pivotally mounted by pin 60 on the downwardly stationary extending lugs 61 and 64 secured to the trip magnet 40 on either side.

Armature 41, which is operable under control of the short time delay mechanism in response to short circuit fault conditions, is provided with a downwardly extending arm 70 which engages the end roller 71 of lever 72 of the short time delay geared mechanism 73 hereinafter described.

Armature 42 which is operable under the control of the long time delay mechanism in response to overcurrent fault conditions is provided with a lug 75 which is connected by pin 76 to the pull rod 77 which in turn is connected through a spring to the long time delay mechanism 80. Armature 42 may be designed to prevent chattering or alternating current hum by the weight 81 mounted on spring 82 (Figures 5 and 6) for the purposes and as disclosed in application Serial No. 68,831, filed January 3, 1949, now U. S. Patent 2,585,600, granted February 12, 1952; and reissued as Re. 23,667, granted June 9, 1953.

The instantaneous trip and the long time delay unit will be described first in connection with Figures 2 to 8. The short time delay unit will be hereinafter described.

As above pointed out, armature 42 is connected by pin 76 to the pull rod 77. Pull rod 77 extends down into the spring housing 85 through the hole in the top piece 86. A compression spring 87 is under compression between top piece 86 of the spring housing 85 and adjusting nut 90 of the rod 77. Compression spring 87 is so adjusted that it is incompressible for currents below the desired setting of the instantaneous trip, and therefore is in effect a relatively solid connection between pin 76 and the long time delay mechanism 80 below for electromagnetic forces exerted on armature 42 by the trip magnet (40) energized by current values in the series coil up to the instantaneous trip point.

Spring 87 is, however, compressible where the forces on the armature 42 correspond to current values at which instantaneous trip of the circuit breaker latch mechanism is desired, in which case armature 42 is moved under electromagnetic forces sufficient to compress spring 87 to trip the circuit breaker latch mechanism 49 without any intentional time delay.

When instantaneous trip is not required, the extensible coupling comprised of housing 85 and compression spring 87 may be replaced by a solid link connecting members 76 and 92. These solid connecting members would not change in length for any value of current and therefore the armature 42 would be restrained at all times by the long time mechanism 80.

Thus, the single armature 42 is used to obtain a long time delay trip at currents above normal in the overload range and an instantaneous non-time delay trip at short circuit currents or other extremely high currents for which the unit is set.

The lower end of formed bracket piece 85 is connected by pin 92 to the lever 93, pivotally mounted on pin 95 carried by the upper section 96 of the long time delay housing 80. Lever 93 is on the outside of the upper portion of the dashpot housing 96. The outer end of lever 93 is provided with a mass at 97 to provide an anti-shock counterbalance for the long time delay unit 80. Lever 93 is rigidly keyed to the pin 95 so that the pin 95 rotates with lever 93. Crank arm 100 is also keyed to the pin 95 at its other end.

The freely rotatable end of crank arm 100 is connected by pin 101 to piston rod 102, the opposite end of which is connected by pin 103 to piston 104 in the lower housing section 105 of the time delay mechanism 80.

Figures 5, 6:
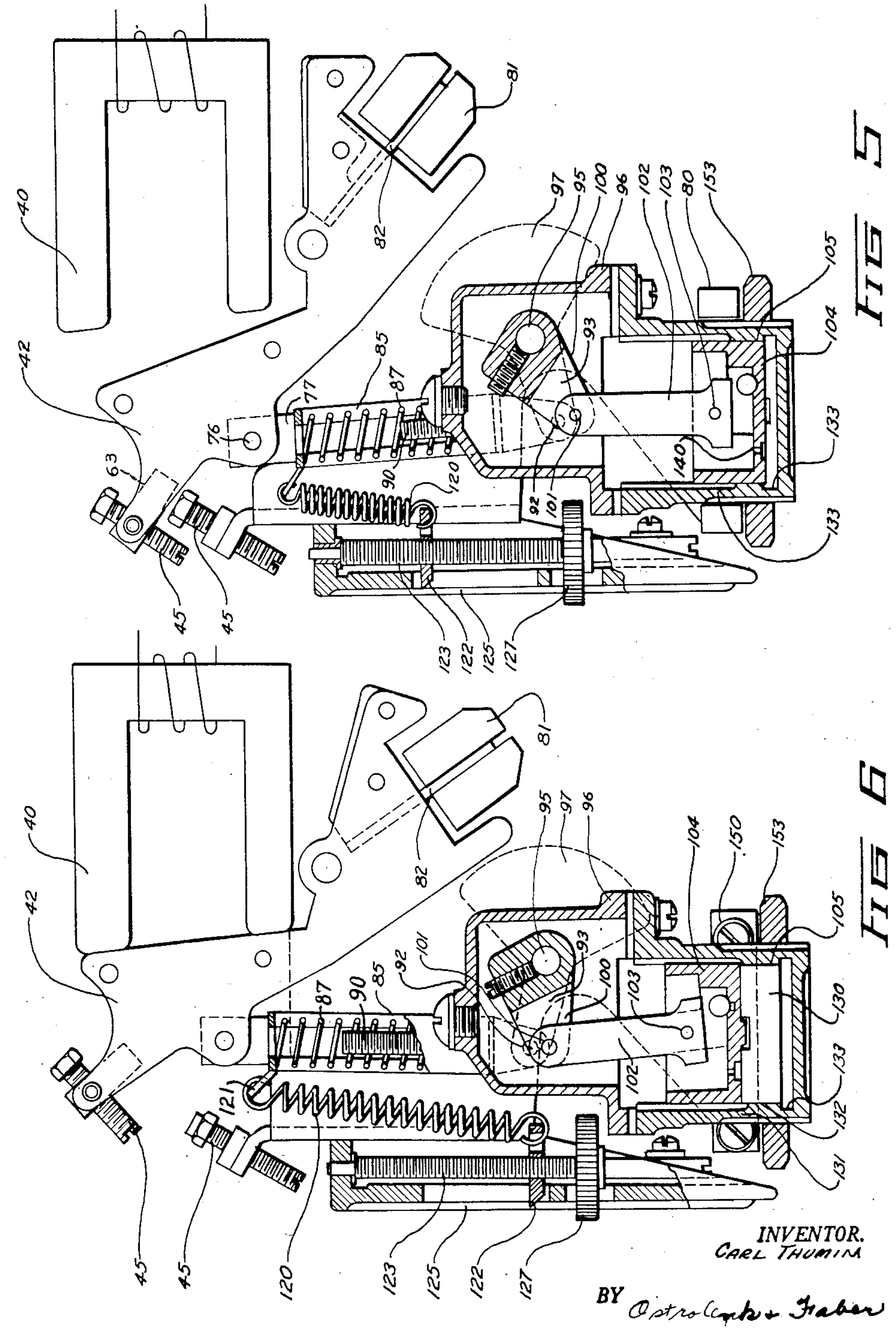
Figure 5 is a vertical sectional view through the long time delay portion of the timing mechanism showing the armature in the de-energized condition and the dashpot set for maximum time delay.
Figure 6 is a view corresponding to that of Figure 5 showing the armature pulled to trip position.
Figure 7:
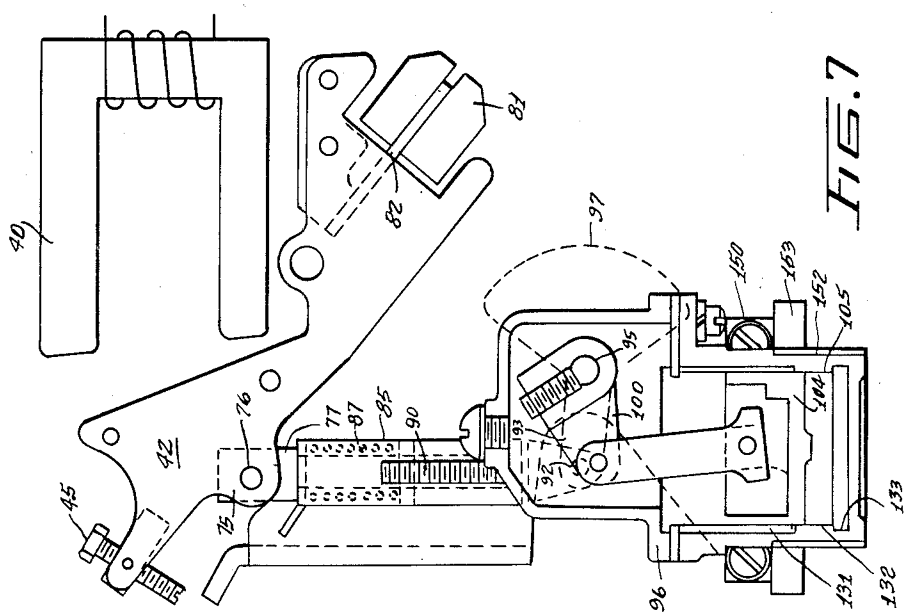
Figure 7 is a view corresponding to that of Figure 5 showing the minimum time delay setting of the long time delay mechanism.
Figure 8:
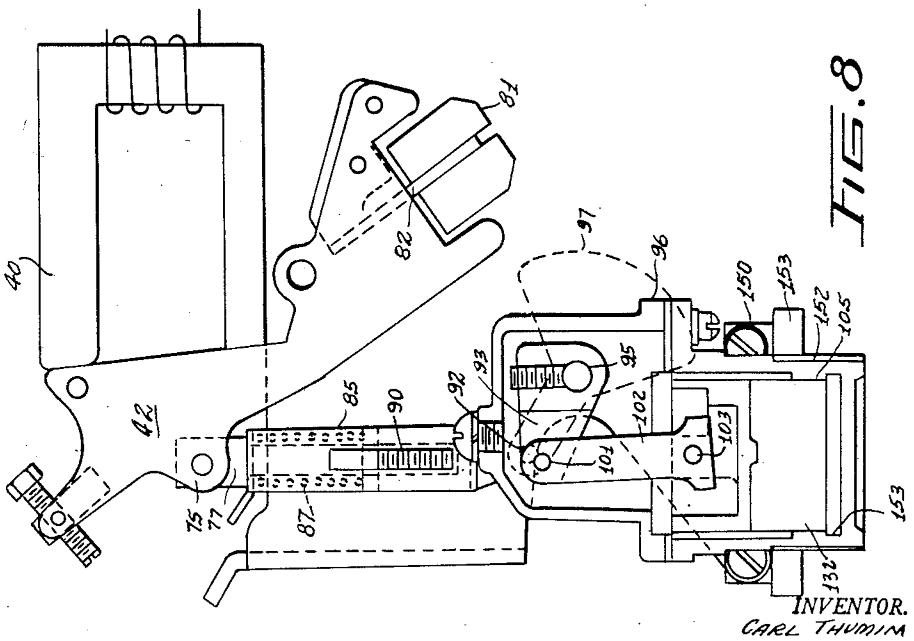
Figure 8 is a view corresponding to that of Figure 6 showing the long time armature in the fully tripped position and the time delay piston after early release from its minimum timing stroke.

The two composite housing elements 96 and 105 may be manually adjusted up and down as required to vary the long time delay while permitting the elements 104, 103, 102, 101, 100, 95, 93, 85 and 42 to remain in the initial positions of Figures 5 and 7.

In other words, in the time delay adjustment hereinafter described, the piston 104 remains stationary in the process of adjusting the long time delay and the two composite housing elements 86 and 105 are moved up and down.

The pick-up current value or calibration of the long time delay armature 42 (Figure 6) is adjustable by means of a calibration spring 120 which is connected at one end to the lug 121 at the top of spring housing 85 and at the other end to the adjustable indicator nut 122 on the calibrating adjusting screw 123. Adjustable indicator nut 122 moves vertically up and down on calibrating adjusting screw 123 along the calibrated scale 125. Screw 123 may be rotated by turning the insulated knurled head 127 which will cause the nut 122 to move up and down vertically in accordance with the direction of rotation of the knurled head 127. The vertical movement of the nut 122 serves to increase or decrease the tension of spring 120.

The long time delay mechanism 80 in housing 96 and 105 may be set independently of the setting of the calibrating spring 120 so that irrespective of any change in the setting of calibrating spring 120, the physical position of the long time delay mechanism 80 in housing 96 and 105 will remain the same.

The piston 104 rides in the oil-filled chamber 130 in the lower housing 105 of the long time delay mechanism 80. The oil-filled chamber has several axial grooves 131 extending part of the length of cylinder 132, and is also provided with an annular lower recess 133. The piston 104 is a close sliding fit within the cylinder 132 as seen in Figure 5.

When the armature 42 is attracted by magnet 40, the armature 42 pulls extensible coupling element 85, which in turn draws up piston rod 102 and the piston 104 from the position of Figure 5 to the position of Figure 6.

Oil in the lower dashpot housing 105 of the long time delay mechanism 80 passes through the restricted opening 140 in the piston 104 and through the space between the piston 104 and cylinder 132 from the upper side to the lower side of the piston, thereby permitting the piston and the armature to move up at a speed determined by the rapidity with which the oil can flow through these openings.

When the lower edge of the timing surface of the piston 104 reaches the lower edges of the axial grooves 131, then a more abundant oil flow is established through these grooves 131 from the top side to the lower side of piston 104, and the piston will now move more rapidly due to a decrease in the retarding element of the restricted oil movement. The armature 42 in turn will be permitted to move more rapidly in its stroke to trip the circuit breaker latch mechanism 49.

This occurs as may readily be seen from a comparison of Figures 5 and 6 at about half or less than half the travel of the armature 42 from the initial position of Figure 5 to the fully sealed trip position of Figure 6, thereby permitting the armature 42 to strike a hammer blow on the tripping bar extension 47 for tripping.

In other words, the full time delay occurs during only the first half of the movement of the armature 42. In order to calibrate the magnitude of the time delay, the housing 96 and 105 of the long time delay mechanism is arranged so that it may be bodily raised or lowered. The initial open position of the armature 42 is established by an adjustment of the rubber tip adjusting screw 45′ which provides an adjustable stop for the fully open position of the armature 42 by engaging with armature tie bar piece 63. In this open position the piston 104 is free to hang in space by being suspended from armature 42 through linkages, etc.

Consequently, the present invention contemplates that in order to increase or decrease the time delay, the dashpot housing elements 96 and 105 of the long time delay mechanism 80 be raised or lowered in order to increase or decrease the amount of stroke which the piston 104 must complete before its lower edge of its timing surface passes the lower edges of axial grooves 131 in the piston cylinder.

Accordingly, Figures 5 and 6 show the setting of the dashpot housing 96 and 105 of the long time delay mechanism 80 with a maximum time delay setting. The dashpot housing 96 and 105 of the long time delay mechanism 80 has been raised to a point where the piston 104 in Figure 5 must travel through its maximum stroke before, as seen in Figure 6, its lower edge of its surface uncovers the grooves 131.

When the dashpot housing 96 and 105 of the long time delay mechanism 80 is lowered as seen in Figure 7, then the distance that the piston 104 must travel from the fully open position of the armature of Figure 7 to a position where it uncovers the grooves 131 is reduced and consequently the total timing stroke is shortened.

As will now be clear, this adjustment of the time delay by raising or lowering the housing 96 and 105 of the long time delay mechanism 80 changes the time delay but does not affect in any way the minimum operating current value of the armature 42 so that the pick-up value of the armature 42 or of the value at which the armature will tend to operate remains the same value irrespective of the long time delay setting achieved by the upward or downward movement of the dashpot housing elements 96 and 105 of the long time delay mechanism 80.

The dashpot housing elements 96 and 105 are supported slidably vertically in support bracket 150 but is not rotatable with respect thereto. The lower end of the exterior of the dashpot housing 105 of the long time delay mechanism 80 is threaded on its side surface 152 and a ring nut 153 is placed thereover.

The ring nut 153 is locked in position by one or more machine screws 65 (Figure 4) so that it cannot accidently be turned. These machine screws 65 are secured to the support bracket 150.

When it is desired to adjust the vertical position of the dashpot housing 96—105 of the long time delay mechanism 80 with relationship with support bracket 150, the ring nut 153 (Figure 7) is released by removal of the machine screws 65 as above described and the nut 153 is turned on the threaded section 152 of the lower housing element 105 of the long time delay mechanism 80.

After the ring nut 153 has been turned to the desired position, it is secured once more against the support bracket 150, thereby determining the vertical position of the dashpot housing elements 96—105 of the long time delay mechanism 80.

Obviously, when the ring nut 153 is turned to raise dashpot housing 96—105 to its highest position, as seen in Figure 5, then the maximum time delay will result because of the greater stroke of the piston before it clears the axial grooves 131 of cylinder 132. When it is turned to lower the dashpot housing 96—105 as seen in Figure 7, then a diminished time delay will result because of the reduction in the stroke of the piston 104 before it clears the axial grooves 131 of cylinder 132.

The type of time delay provided by the long time delay has already been described in connection with the graphic illustration of Figure 1 and corresponds to curve sections A, B and C.

Figure 20:
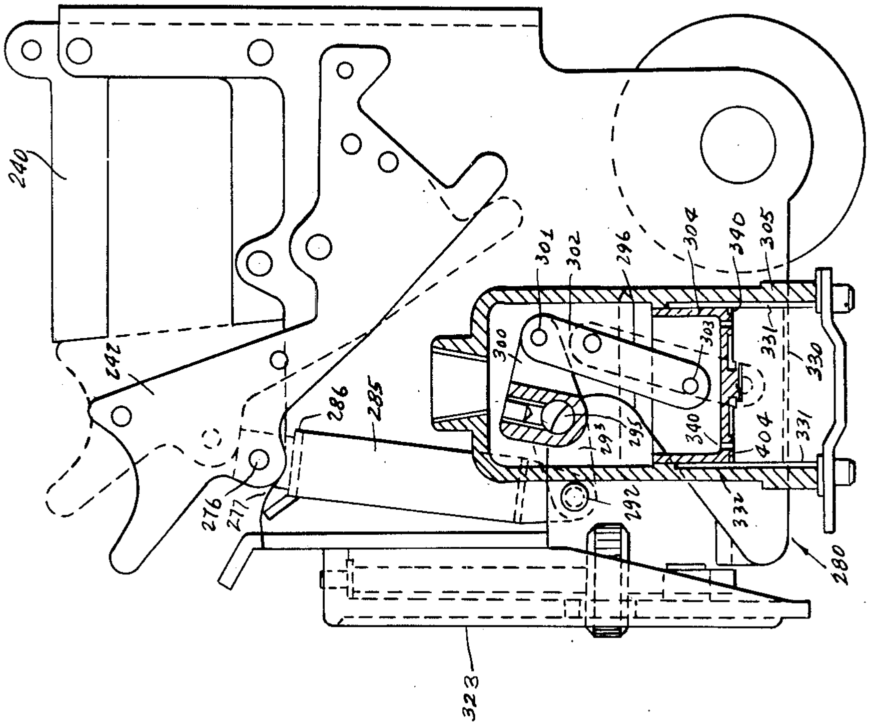
Figure 20 is a vertical sectional view through a modification of the long time delay position of the present invention.
Figure 22:
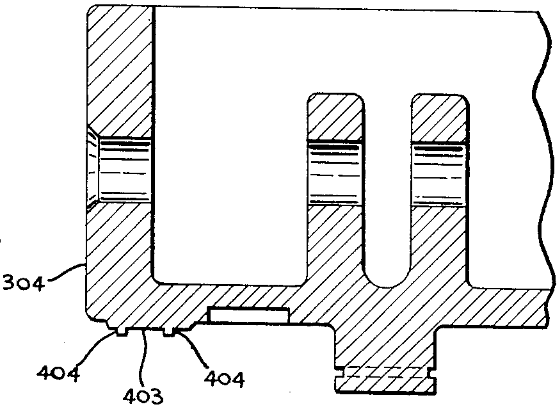
Figure 22 is a partial cross-sectional view of a portion of the novel long time delay unit of the present invention.

The long time delay however as described above is of the suction type and is limited to a force which does not exceed one atmospheric pressure when the vapor pressure of the oil is added to the pull on the piston to make it suitable for larger breakers, a push type dashpot is utilized in the long time delay unit as shown in Figures 20 and 22.

The armature 242 is connected by pin 276 to the pull rod 277. Pull rod 277 extends down on the spring housing 285 through the hole in the top piece 286. An adjustable compression spring not shown is biased against top piece 286 of the spring housing 285 so as to be incompressible for currents below the desired setting of the instantaneous trip and therefore is in effect a relatively solid connection between pin 276 and long time delay mechanism 280 described below, for electromagnetic forces exerted on armature 242 by the trip magnet 240 energized by current values in the series coil not shown, up to the instantaneous trip point.

The spring as described above in reference to Figure 3 is however compressible where the forces on the armature 242 correspond to current values at which instantaneous trip of the circuit breaker latch mechanism is desired, in which case armature 242 is moved under electromagnetic forces sufficient to compress the spring to trip the circuit breaker latch mechanism as described above without any intentional time delay.

When instantaneous trip is not required, the extensible coupling comprised of housing 85 and the compression spring may be replaced by a solid link connecting members 276 and 292. These solid connecting members would not change in length for any value of current and therefore the armature 242 would be restrained at all times by the long time mechanism 280.

Thus, the single armature 242 is used to obtain a long time delay trip at currents above normal in the overload range and an instantaneous non-time delay trip at short circuit currents or other extremely high currents for which the unit is set.

The lower end of formed bracket piece 285 is connected by pin 292 to the lever 293, pivotally mounted on pin 295 carried by the upper section of the long time delay housing 280. Lever 293 is on the outside of the upper portion of the dashpot housing 296. Lever 293 is rigidly keyed to the pin 295 so that the pin 295 rotates with lever 293. Crank arm 300 is also keyed to the pin 95 at its other end.

The freely rotatable end of crank arm 300 is connected by pin 301 to piston rod 302, the opposite end of which is connected by pin 303 to piston 304 in the lower housing section 305 of the time delay mechanism 280.

The two composite housing elements 296 and 305 may be manually adjusted up and down as required to vary the long time delay while permitting the elements 304, 303, 302, 301, 300, 295, 293, 285 and 242 to remain in their initial positions.

In other words, in the time delay adjustment hereinafter described, the piston 304 remains stationary in the process of adjusting the long time delay and the two composite housing elements 286 and 305 are moved up and down.

The pick-up current value or calibration of the long time delay armature 242 is adjustable by means of a calibration spring as described above in reference to Figure 5.

The adjusting unit 323 as shown in Figure 20 contains elements not shown, but similar to 122, 123, 125, and 127 of Figure 5 series to calibrate the long time delay armature 242.

The long time delay mechanism 280 in housing 296 and 305 may be set independently of the setting of the calibrating spring so that irrespective of any change in the setting of the calibrating spring the physical position of the long time delay mechanism 280 in housing 296 and 305 will remain the same.

The piston 304 rides in the oil-filled chamber 330 in the lower housing 305 of the long time delay mechanism 280, and differs from the disclosure as shown in Figures 2 through 8 having a reversal leverage system as described above to push against the oil instead of pulling.

Oil in the lower dashpot housing 305 of the long time delay mechanism 280 passes through the restricted openings 340 in the piston 104 and through the space between the piston 304 and cylinder 332 from the lower side to the upper side of the piston, thereby permitting the piston to move down and the armature to move up at a speed determined by the rapidity with which the oil can flow through these openings.

When the upper edge of the timing surface of the piston 304 reaches the upper edges of the axial grooves 331, then a more abundant oil flow is established through these grooves 331 from the bottom side to the upper side of piston 304, and the piston will now move more rapidly due to a decrease in the retarding element of the restricted oil movement. The armature 242 in turn will be permitted to move more rapidly in its stroke to trip the circuit breaker latch mechanism.

This occurs at about half or less than half the travel of the armature 242 from the initial position of Figure 20 to the fully sealed trip position thereby permitting the armature 242 to strike a hammer blow on the tripping bar extension shown in reference to Figure 1A for tripping.

In other words, the full time delay occurs during only the first half of the movement of the movement of the armature 242. In order to calibrate the magnitude of the time delay, the housing 296 and 305 of the long time delay mechanism is arranged so that it may be bodily raised or lowered.

The present invention contemplates that in order to increase or decrease the time delay, the dashpot housing elements 296 and 305 of the long time delay mechanism 280 be raised or lowered in order to increase or decrease the amount of stroke which the piston 304 must complete before its upper edge of its timing surface passes the upper edges of axial grooves 331 in the piston cylinder.

Figure 21:
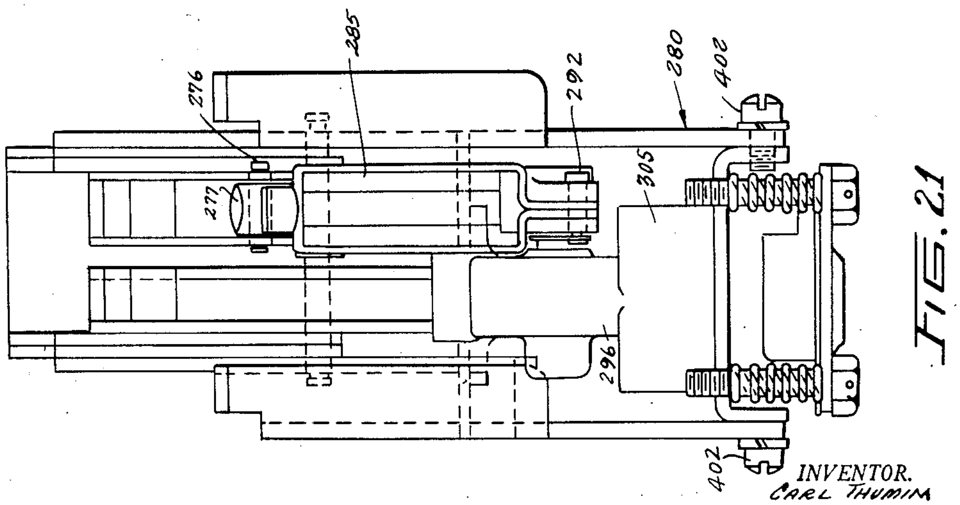
Figure 21 is a side view of a modification of the long time delay portion of the present invention.

The adjustment as described with reference 2—8 and above is caused by moving the dashpot bodily up and down. In the present modification as shown in Figure 21 two screws 402 are used to cause motion in small amounts while the dashpot itself is being guided in the grooves which surround extensions on the body 305.

Figure 23:
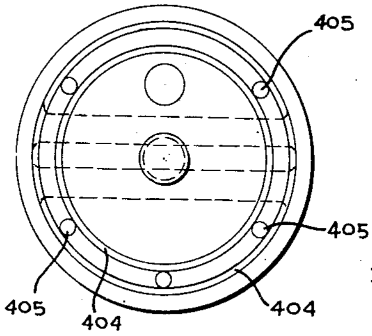
Figure 23 is a top view of a portion of the novel long time delay unit of the present invention.
Figure 24:
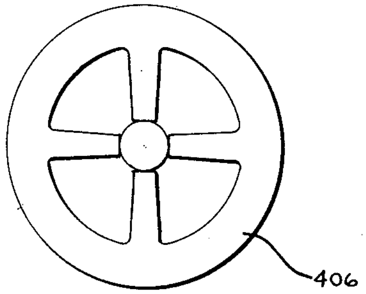
Figure 24 is a top view of another portion of the novel long time delay unit of the present invention.

To permit rapid reset and no memory the piston 304 is provided with an annular groove 403 seen more particularly in Figure 22 between two lands 404 with five holes 405, Figure 23 leading from the under side to the upper. The lands 404 are covered by a valve diaphragm 406 as shown in Figure 24 which is very thin but strong enough to withstand the bending between the lands 404. It is held with very slight tension against the lands 404 so that the dashpot or piston 304 is ready to operate when pushed against the oil.

The instant the piston 304 is reversed, the large area of pressure acting against the very thin diaphragm 406 will open it instantly and reduce the back pressure to a very small minimum.

The short time delay is indicated in Figures 1A and 2 and is more specifically disclosed in Figures 9 to 17, inclusive.

Basically, the short time delay member 73 is a mechanical escapement mechanism having a verge 190 which controls the speed of rotation of the lever 72. Lever 72 bears against the lower extension 70 of the short time armature 41 so that when the short time armature 41 moves from the full open position of Figures 14 and 15 toward the tripping position of Figure 16 and before it completes its full trip movement of Figure 17, it must rotate the lever 72 in a clockwise direction as the armature rotates in a counterclockwise direction.

Since the armature 41 cannot rotate toward tripping position without rotating the lever 72 in a clockwise direction, the escapement mechanism in the short time delay housing 73 which is secured to the lever 72 controls the speed of rotation of said lever 72; therefore the escapement mechanism 73 controls the speed of movement of the armature 41 in its stroke toward the trip position of the device.

Figures 9, 10, 11, 12, 13, 18:
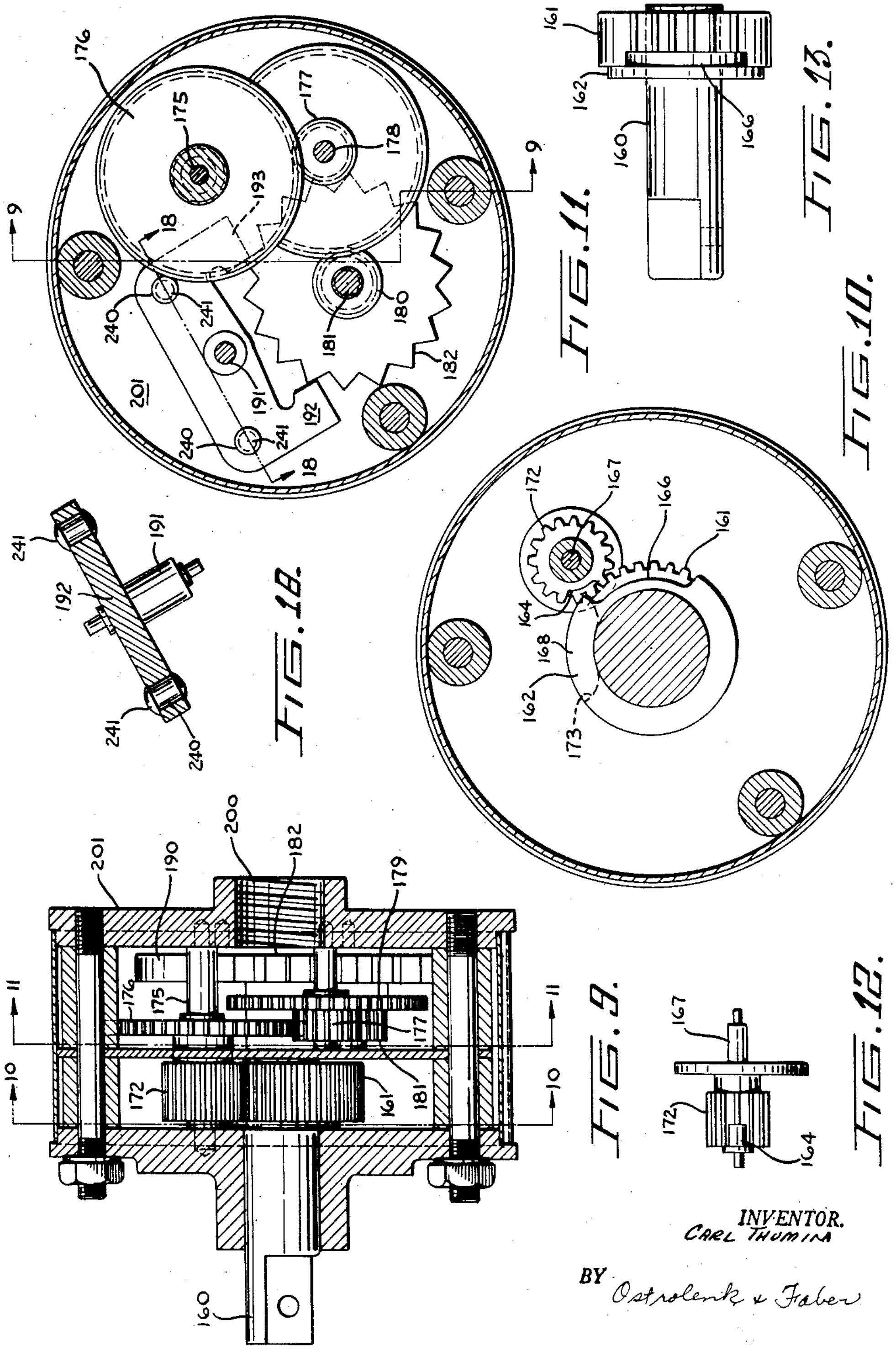
Figure 9 is a sectional view of the short time delay mechanism taken from line 9—9 of Figure 11.
Figure 10 is a view partly in section of the short time delay mechanism taken from line 10—10 of Figure 9.
Figure 11 is a view partly in section of the short time delay mechanism taken from line 11—11 of Figure 9.
Figure 12 is a side view of the run-off pinion and shaft of the time delay mechanism of Figure 9.
Figure 13 is a side view of the run-off gear assembly of the short time delay mechanism of Figure 9.
Figure 18 is a view in cross-section taken on line 18—18 of Figure 11 looking in the direction of the arrows.

The escapement mechanism 73, as seen more particularly in Figures 9 to 13, is comprised of a housing 73, a shaft 160 extending therefrom and carrying a segment gear 161 and shrouding plate 162 thereon (see also Figure 13). Segment gear 161 meshes with the pinion 172. The pinion 172 is provided with a recess 164 (see also Figure 12) registering with the shrouding plate 162.

As the shaft 160 is turned, the segment gear 161 which meshes with the pinion 172 rotates the pinion until the segment gear 161 escapes from the pinion 172. The shrouding plate 162 is recessed at 166 below the level of the teeth 167 of the segment gear 161 so that it does not interfere with the meshing engagement between teeth 167 of segment gear 161 and the teeth of pinion 172.

After the full time delay has been achieved as hereinafter described, then it is necessary that the armature escape the time delay mechanism. At this time the shrouding plate 162 and particularly portion 168 thereof comes into registry with the recess 164 of the pinion 172 holding the pinion 172 stationary while the shrouding plate 162 and the shaft 160 may rotate readily with respect thereto.

The segment gear 161 is cut away at 173 so that it will not obstruct the movement of segment gear 161 and shaft 160 at this run-off position.

Figure 17:
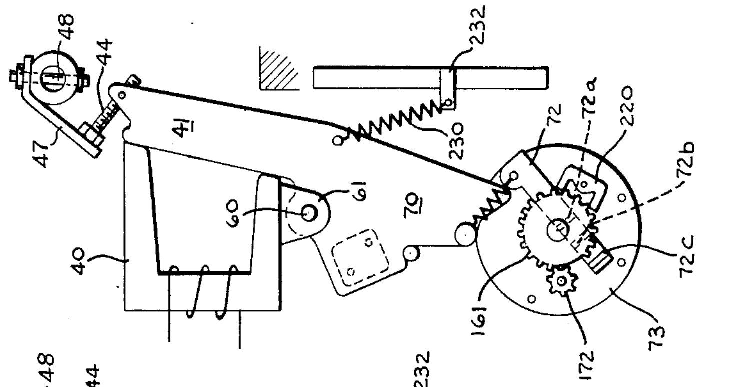
Figure 17 is a view showing the fully tripped position of the timing mechanism of Figure 15.
Figure 16:
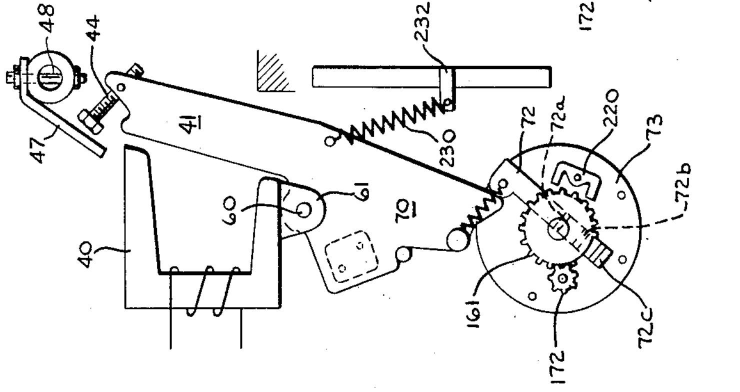
Figure 16 is a view showing the partially tripped position of the timing mechanism of Figure 15.
Figure 15:
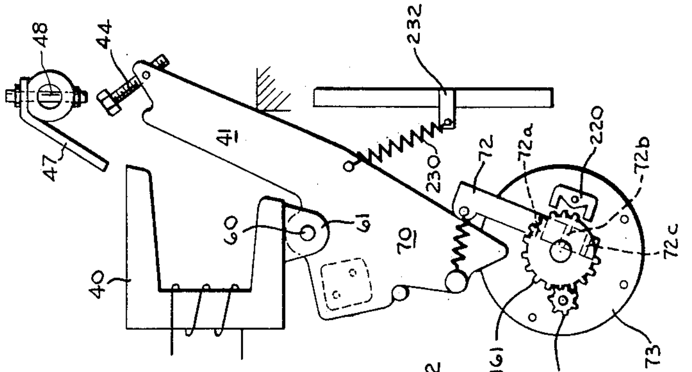
Figure 15 is a schematic view corresponding to that of Figure 14 but showing a different time delay setting of the gear train.
Figure 14:
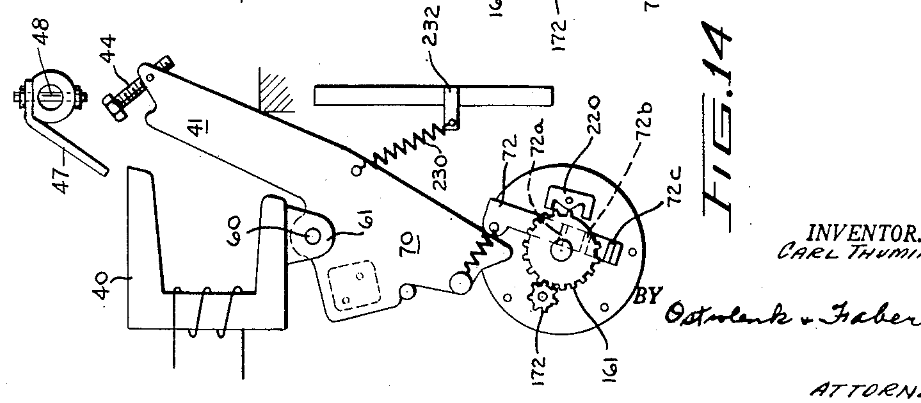
Figure 14 is a schematic view of the short time delay mechanism, its armature and trip bar showing one adjustment of the gear train.

Consequently, the movement of teeth 167 of the segment gear from the position of Figures 14 or 15 to the position of Figure 16 is time delayed thereby delaying the rotation of lever 72 and resulting in a time delay on armature 41, but when the armature reaches the halfway point as shown in Figure 16, then as can be seen from a comparison of Figures 16 and 17, the segment gear 161 disengages tooth engagement with the pinion 172 permitting an unrestrained stroke of the armature 141 to engagement with tripper bar 47 with a hammer blow.

In order to avoid misalignment between the parts of the escapement mechanism, the engagement of the raised portion 168 of the shrouding plate 162 in the recess 164 of the pinion 172 holds the pinion 172 and the associated mechanism hereinafter described in the position they held at the time the teeth 167 of gear segment 161 left the pinion 172 so that during the return movement when the teeth 167 engage the pinion 172, the relationship between the teeth 167, the raised portion 168 of shrouding desired condition, to re-establish mesh engagement of the teeth of the segment gear 161 and the teeth of the pinion gear 172.

Thus, in order to achieve the short time delay, it is necessary to selectively delay the rotation of the pinion 172. Pinion 172 is carried on shaft 175 which carries the gear 176. Gear 176 meshes with gear 177 on shaft 178 which carries the gear 179. Gear 179 meshes with gear 180 on shaft 181 which carries the toothed escapement rack 182.

Verge 190 rotatable on pin 191 has opposite teeth 192, 193 which alternatively engage with the teeth of escapement wheel 182 and limit its speed of rotation by the speed with which the teeth 192 and 193 of the verge 190 can successively escape the wheel 182 by oscillation of the verge 190. The planes of the teeth of the escapement wheel 182 are so oriented that the direction of the force line between wheel 182 and verge teeth 192 falls outside of verge pivot 191 by a definite amount. The resulting movement causes the speed of oscillation of verge 190 to vary in direct proportion to the magnitude of the force impressed on it by wheel 182.

Thus, as has been pointed out, the rotation of armature 41 to the trip position causes its end 70 to rotate the operating lever 72 of the short time mechanism 73 which is secured to the shaft 160 and which through the mechanism above set forth operates the timing mechanism to effect the short time delay in restraint of clockwise rotation of armature 41. The greater the force exerted by armature 41, the greater the speed of oscillation of verge 190 and the shorter the time delay.

The entire time delay unit in housing 73 may be secured in any suitable manner as by the hollow threaded section 200 in wall 201 of the housing on an appropriate support and may be rotatably adjusted as shown, for instance, by a comparison of Figures 14 and 15 to a position where a greater or less number of the teeth 167 of the gear segment 161 must pass in engagement with the pinion 172 before the run-off condition is achieved wherein extension 168 of the shrouding plate 162 passes freely through the recess 164 of the pinion 172 while the recess 173 in gear segment 161 permits free rotation of the gear segment 161 past the pinion 172.

Thus, in the adjustment of Figure 14, the time delay is relatively greater than in the adjustment of Figure 15 where fewer teeth of gear segment 161 must traverse the pinion 172 before the run-off condition which permits the armature to move freely as shown in Figure 17 is reached. This adjustment is utilized to obtain a vernier adjustment of the short time delay mechanism 73 within a given time delay band.

The time delay may be adjusted for the three bands previously described in connection with Figure 1 by an adjustment of the effective length of lever 72.

Thus, lever 72 may be provided with three securing holes 72*a*, 72*b*, 72*c* for securing the same to the shaft 160. Where the lever 72 is of its minimum adjustable length, then the armature 41 for a given current value exerts less torque about the shaft 160 to rotate the geared mechanism 73 and the time delay is maximum. Where lever 72 is made relatively longer, the armature 41 exerts more torque about shaft 160 due to increased effective lever length and the time delay is relatively less.

By providing three selectively usable securing holes 72*a*, 72*b*, 72*c* on the lever 72 for securing the same by means of screw 220 to the shaft 160, a time delay adjustment to set the short time delay for each of the three bands previously described in Figure 1 may be obtained.

The short time delay armature 41 is used for the purpose of obtaining a short time delay expressed in cycles for currents exceeding a given minimum value. This is in contrast to the long time delay armature 42 which is used for the purpose of obtaining a long time delay expressed in seconds or in minutes for current values in the recognized range of overcurrents and also for the purpose of obtaining an instantaneous trip which operates faster than the long time delay as previously described in the event of a short circuit or other predetermined high overcurrent condition.

The short time delay armature 41 is adjustably calibrated as to its pick-up point by the calibrating spring 230 (Figure 2 and Figures 14 to 17). Spring 230 is connected to opening 231 on the armature and to calibrating nut 232 on the calibrating screw 233 which may be readily rotated in order to move the nut 232 up or down the indicator scale 235 which may be used, if desired.

Raising the nut 232 will decrease the tension of the restraining spring 230 and lowering nut 232 will increase the tension of the restraining spring. Thus, the short time delay armature 41 may be adjusted to pick up at any desired value of current.

It will be obvious that the adjustment of the short time delay mechanism 73 is completely independent of the adjustment of the calibrating spring 230 so that irrespective of the setting of the calibrating spring 230 and the indicator nut 232, the time current characteristics will remain as set and the spring 230 calibration may be altered without altering the time current minimum pick-up value of armature 41.

By this means, therefore, a simplified independently adjustable long time delay mechanism, a simplified independently adjustable short time delay mechanism, and a simplified independently adjustable calibrating means for each of the armatures is provided.

Thus, a circuit breaker may be set for appropriate time delays at the factory and thereafter a field setting of the pick-up value of either or both of the armatures will not affect the time delay characteristics and the time delay settings may each independently be adjusted in the field and thereafter the pick-up value or calibration of the armatures may be varied in the field without interfering with the time delay settings or the relative values at which each of the time delay factors will occur. The change in the minimum pick-up of the instantaneous element due to change in the long time delay spring 120 will be negligible.

In other words, then, irrespective of the pick-up value for either armature set by the calibrating springs, the curves of Figure 1 will hold true. The only difference that would occur should the pick-up value be adjusted to a higher level is that the curve for one armature would be displaced to the right without interfering with the operation of the circuit breakers in accordance with the curve for the other armature.

Figure 19:
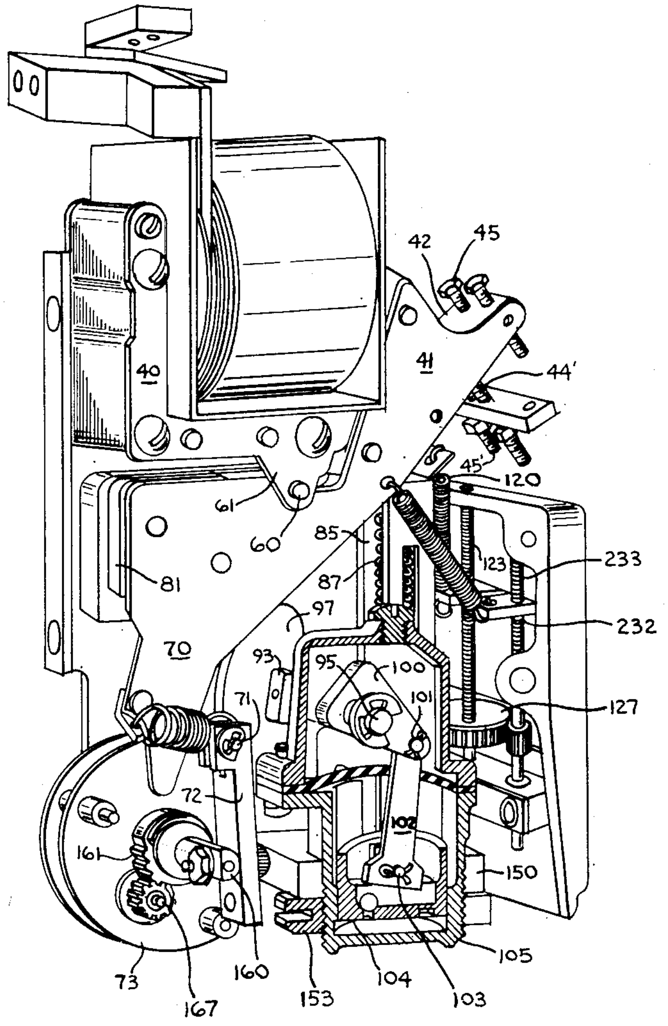
Figure 19 is a view in perspective, partially broken away, of the complete time delay apparatus.

The entire time delay apparatus is shown in perspective in Figure 19; the description of the parts in connection with the other fragmentary and diagrammatic figures will now make the complete operation clear.

In the operation of the short time delay unit herein described in connection with Figures 9 to 17, it was found at first that the curve at certain values did not follow the desired path but that the time delay characteristics varied somewhat from the optimum. The intermittent motion caused by the escapement type of timing was transferred in the form of a forced vibration to armature 41 and caused natural frequency vibration of 41 resulting in lack of timing accuracy. This was cured by the elastic suspension of the counterweight 81*a* of Figure 2 on a pair of rubber washers 81*d* inserted between the plates of the armature thereby acting as a damper or by the vibrating mounting of weight 81 on spring 82 of Figure 5. Both of these were preferable to the solid mounting of counterweight 81*c* of Figure 4. Member 81 may be either a solid member, a vibrator as in Figure 5, or a cushioned member as in Figure 2. It was also found that the natural resonant frequency of the verge 190 asserted itself at certain speeds of the rack 182 and periods of oscillation of the verge 190 in relation to the pulsations of the forces due to the alternating current magnetic forces so as to cause the verge to effect synchronized action with the rack 182. An unproportional increase in the time delay will result if the elements of the device are allowed to reach this stage.

Accordingly, and to damp this natural frequency of the verge 190, a pair of holes 240 are placed in opposite sides of the verge 190 (see Figures 11 and 18) and loose rivets 241 are mounted therein, the rivets 241 shaking or rattling during the oscillation of the verge 190 and damping out its natural frequency of vibration.

Various other means may be utilized to destroy the natural frequency of vibration of the verge 190 or the effect thereof, such as the use of liquids sealed in two chambers with a connecting orifice, or the use of spring members of various kinds, but the utilization of the loose rivets in the holes in the verge 190 was found to smooth out the curve of operation so that the curve of operation followed the actual theoretically correct curve without any variation. This type of operation is the exact opposite of that required in a time piece in which the natural frequency of the oscillating member is depended upon to maintain time keeping accuracy and the greatest effort is made to prevent differences in tension of the actuating spring to affect the period of oscillation of the verge.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claims.

I claim:

1. A time delay mechanism for a circuit breaker having a trip unit comprising a long time delay mechanism operable to delay the operation of said trip unit for times of the order of seconds in response to an overload current and a short time delay mechanism operable to delay the operation of said trip unit for times of the order or cycles in response to short circuit currents, and a common container for said long and short time delay mechanism, said container being removably securable to said circuit breaker, and means individual to said long and short time delay mechanism for calibrating said mechanism individually and independent of any effect on the other of said mechanisms, said long delay mechanism comprising a piston, a piston housing, connecting means actuating said piston in response to an overload current, oil substantially surrounding said piston, said piston housing having grooves in the lower portion thereof so that after a partial completion of the stroke against said oil, said grooves permit some of said oil to flow around said piston allowing said circuit breaker to trip with impact.

2. A time delay mechanism for a circuit breaker having a trip unit comprising a long time delay mechanism operable to delay the operation of said trip unit for times of the order of seconds in response to an overload current and a short time delay mechanism operable to delay the operation of said trip unit for times of the order or cycles in response to short circuit currents, and a common container for said long and short time delay mechanism, said container being removably securable to said circuit breaker, and means individual to said long and short time delay mechanism for calibrating said mechanism individually and independent of any effect on the other of said mechanisms, said long delay mechanism comprising a piston, a piston housing, connecting means actuating said piston in response to an overload current, oil substantially surrounding said piston, said piston housing having grooves in the lower portion thereof so that after a partial completion of the stroke against said oil, said grooves permit some of said oil to flow around said piston allowing said circuit breaker to trip with impact, and means permitting rapid reset without memory of said piston, said last mentioned means comprising a thin valve diaphragm, said piston having an annular groove, two lands and a plurality of recesses leading through said piston, said valve diaphragm covers said lands so that the instant the motion of said piston is reversed a large area of pressure acts against said diaphragm opening it instantaneously reducing the back pressure to a negligible amount.

References Cited in the file of this patent

UNITED STATES PATENTS

| | | |
|---|---|---|
| 737,460 | Oxley | Aug. 25, 1903 |
| 1,014,257 | Rosenqvist | Jan. 9, 1912 |
| 2,298,208 | Gilbert | Oct. 6, 1942 |
| 2,486,596 | Graves | Nov. 1, 1949 |
| 2,486,602 | Jensen et al. | Nov. 1, 1949 |
| 2,486,613 | Ridgley | Nov. 1, 1949 |
| 2,495,127 | Oppel | Jan. 17, 1950 |
| 2,504,855 | Ludwig et al. | Apr. 18, 1950 |
| 2,570,170 | Viti | Oct. 2, 1951 |
| 2,632,823 | Oppel | Mar. 24, 1953 |
| 2,704,311 | Thumim | Mar. 15, 1955 |